United States Patent
Yamauchi et al.

(10) Patent No.: US 11,489,397 B2
(45) Date of Patent: Nov. 1, 2022

(54) DRIVE DEVICE

(71) Applicant: DENSO CORPORATION, Kariya (JP)

(72) Inventors: Daichi Yamauchi, Kariya (JP); Naohiro Yamamoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 156 days.

(21) Appl. No.: 16/874,637

(22) Filed: May 14, 2020

(65) Prior Publication Data

US 2020/0366153 A1 Nov. 19, 2020

(30) Foreign Application Priority Data

May 17, 2019 (JP) .............................. JP2019-093609

(51) Int. Cl.
*H02K 5/10* (2006.01)
*H02K 5/04* (2006.01)
(Continued)

(52) U.S. Cl.
CPC ................. *H02K 5/10* (2013.01); *H02K 5/04* (2013.01); *H02K 5/225* (2013.01); *H02K 11/33* (2016.01)

(58) Field of Classification Search
CPC . H02K 5/10; H02K 5/04; H02K 11/33; H02K 5/225; H02K 5/08; H02K 15/14; H02K 2211/03; H02K 11/30; H02K 11/00; H02K 11/35; H02K 11/38; H02K 5/00; H02K 5/02; H02K 5/12; H05K 5/0052
(Continued)

(56) References Cited

U.S. PATENT DOCUMENTS

| 9,723,740 B2 * | 8/2017 | Yang .................... H05K 5/0052 |
| 2014/0085839 A1 * | 3/2014 | Nakano ................ H05K 5/0052 361/752 |

(Continued)

FOREIGN PATENT DOCUMENTS

| JP | H11-254377 A | 9/1999 |
| JP | 5786974 B2 | 8/2015 |

(Continued)

OTHER PUBLICATIONS

Chiba et al, Resinous Compound, Nissin Kogyo Co. Ltd., WO 2018151064 (English Machine Translation) (Year: 2018).*
(Continued)

*Primary Examiner* — Alexander A Singh
(74) *Attorney, Agent, or Firm* — Maschoff Brennan

(57) ABSTRACT

A drive device includes a drive unit having an annular shaped adhesion recess portion, a cover including an annular shaped adhesion protrusion portion that faces the adhesion recess portion, an adhesive sealant that adheres the adhesion recess portion to the adhesion protrusion portion, and a spacer that maintains a distance between the adhesion recess portion and the adhesion protrusion portion. Therefore, it is possible to ensure that a space is formed between the adhesion recess portion and the adhesion protrusion portion, and adhesive sealant is able to enter this space. As a result, it is easier to ensure that the adhesion recess portion and the adhesion protrusion portion are bonded in a stable manner by the adhesive sealant. Therefore, it is possible to provide a drive device in which components are appropriately adhered and fixed to each other.

11 Claims, 7 Drawing Sheets

(51) Int. Cl.
*H02K 11/33* (2016.01)
*H02K 5/22* (2006.01)

(58) Field of Classification Search
USPC .................................................. 310/89, 68 R
See application file for complete search history.

(56) References Cited

U.S. PATENT DOCUMENTS

| | | |
|---|---|---|
| 2015/0115755 A1 | 4/2015 | Yamasaki et al. |
| 2016/0094104 A1* | 3/2016 | Yamasaki .............. H02K 11/33 |
| | | 310/68 D |
| 2016/0165736 A1* | 6/2016 | Tsuboi ................... H02K 11/33 |
| | | 310/71 |
| 2016/0218583 A1* | 7/2016 | Hayashi ................... H02K 5/10 |
| 2019/0252953 A1 | 8/2019 | Tsuboi et al. |
| 2019/0372419 A1 | 12/2019 | Ogawa et al. |
| 2019/0372420 A1 | 12/2019 | Ogawa et al. |

FOREIGN PATENT DOCUMENTS

| | | | | |
|---|---|---|---|---|
| JP | 2018-082523 A | 5/2018 | | |
| WO | WO-2018151064 A1 * | 8/2018 | ........... | B29C 66/112 |

OTHER PUBLICATIONS

U.S. Appl. No. 16/874,639 and its entire file history, filed May 14, 2020, Kawaguchi et al.

\* cited by examiner

DRIVE DEVICE

CROSS REFERENCE TO RELATED APPLICATION

The present application claims the benefit of priority from Japanese Patent Application No. 2019-093609 filed on May 17, 2019. The entire disclosure of the above application is incorporated herein by reference.

TECHNICAL FIELD

The disclosure in this specification relates to a drive device.

BACKGROUND

A drive device typically includes several components that are assembled together, such as a motor, a housing, and a cover.

SUMMARY

In one aspect of this disclosure, a drive device includes a drive unit having an annular shaped adhesion recess portion, a cover including an annular shaped adhesion protrusion portion that faces the adhesion recess portion, an adhesive sealant that adheres the adhesion recess portion to the adhesion protrusion portion, and a spacer that maintains a distance between the adhesion recess portion and the adhesion protrusion portion.

DETAILED DESCRIPTION

Figure 1:
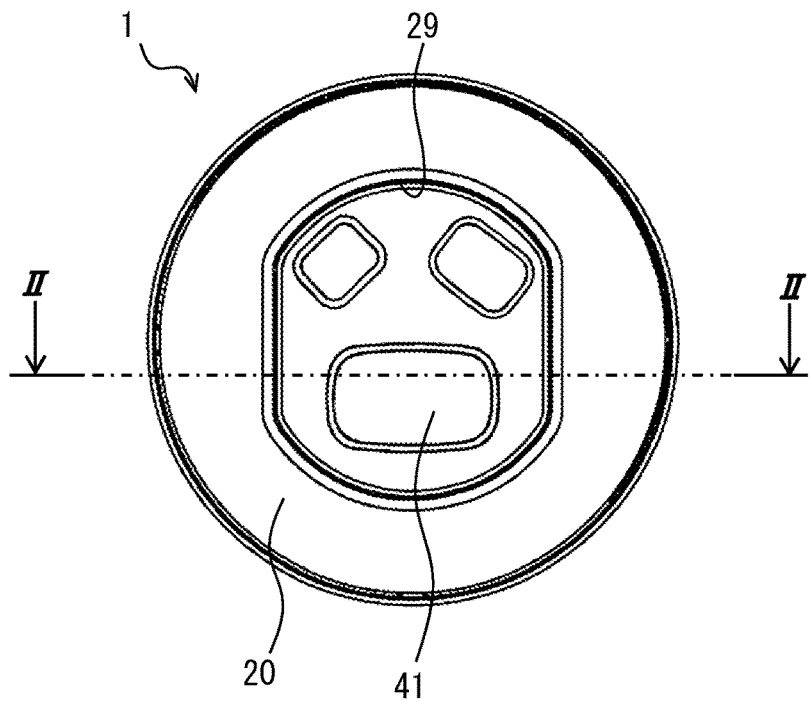
FIG. 1 is a top view showing a drive device.

Embodiments will be described with reference to drawings. In some embodiments, parts that are functionally and/or structurally corresponding to each other and/or associated with each other are given the same reference numerals, or reference numerals with different hundred digit or more digits. For corresponding parts and/or associated parts, additional explanations can be made to the description of other embodiments.

First Embodiment

A drive device 1 is a device that performs electric drive operation, and can be used as a rotating electric machine device such as a motor device or a power generation device. Alternatively, the drive device 1 can also be used for an actuator device that does not involve rotation. The drive device 1 can be used, for example, as a device mounted on a vehicle and constituting a part of an electric power steering device. Hereinafter, a case where the drive device 1 is used as a part of an electric power steering device for a vehicle will be described as an example.

Figure 2:
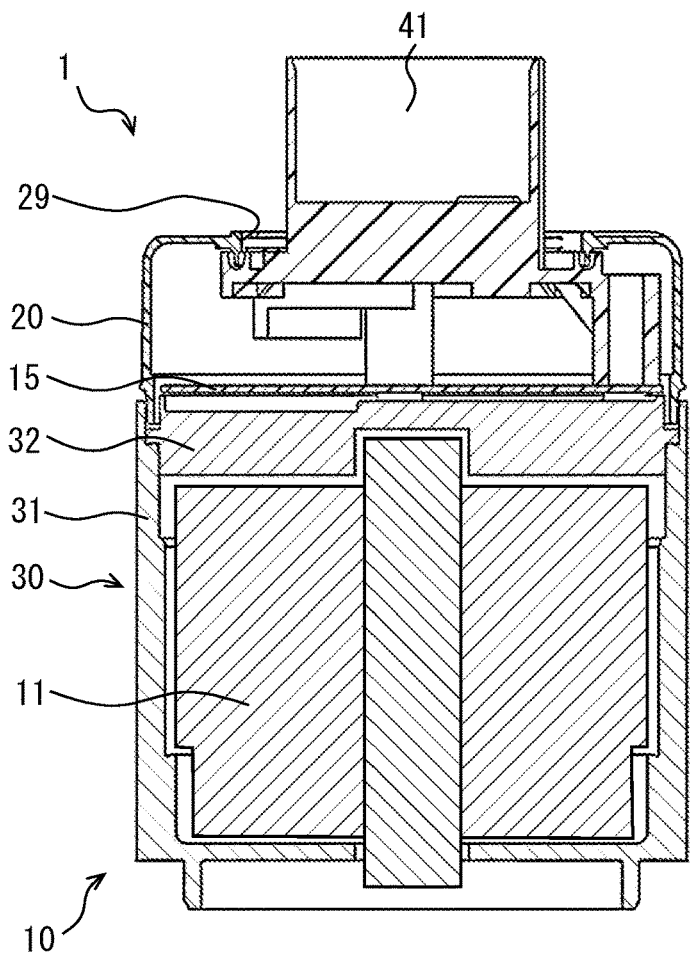
FIG. 2 is a cross-sectional view showing a cross section taken along line II-II of FIG. 1.

In FIGS. 1 and 2, the drive device 1 includes a drive unit 10 and an annular cover 20. The drive unit 10 includes a motor 11, a circuit substrate 15, a frame 30, and a connector 41. The motor 11 is an electric motor that converts electric energy into rotational motion. The motor 11 is a device that provides the driving force of the drive device 1. Alternatively, this driving force may be provided by using a device such as an actuator instead of the motor 11. The frame 30 has a bottomed cylindrical shape. The frame 30 includes a motor case 31 that is a cylindrical body, and a frame end 32 that forms a bottom surface. Here, the term "bottom" refers to the closed portion of the frame 30, and is not intended to refer to directionality. The frame 30 houses the motor 11 in a housing space surrounded by the motor case 31 and the frame end 32. The motor case 31 and the frame end 32 are made of a metal material having high thermal conductivity.

The circuit substrate 15 includes a plurality of circuit components for controlling the motor 11. Part of the circuit substrate 15 is in contact with the frame end 32. Heat generated in the circuit components of the circuit substrate 15 is transmitted to the frame end 32 and dissipated from the frame end 32. In other words, the frame end 32 functions as a heat sink that promotes cooling of the circuit substrate 15. The connector 41 is a component for transmitting signals, electric power, etc. from outside the drive device 1 to the motor 11 and the circuit substrate 15.

The annular cover 20 is mounted on the drive unit 10. The annular cover 20 is smaller than the drive unit 10. The annular cover 20 is lighter than the drive unit 10. The annular cover 20 has an inner peripheral opening 29 forming an opening at the center of the annular cover 20. When the annular cover 20 is mounted on the drive unit 10, a part of the connector 41 protrudes outward from the opening formed by the inner peripheral opening 29. The annular cover 20 is a resin component and may be formed of, for example, a resin such as polybutylene terephthalate. The annular cover 20 is one example of a cover.

When the annular cover 20 is attached to the drive unit 10, only a part of the connector 41 is exposed to outside. As such, the remaining part of the connector 41, the circuit substrate 15, and the frame end 32 are not exposed to outside. In other words, by attaching the annular cover 20, it is possible to prevent water and dust from adhering to the circuit substrate 15 and the like, thereby protecting the circuit substrate 15.

Figure 3:
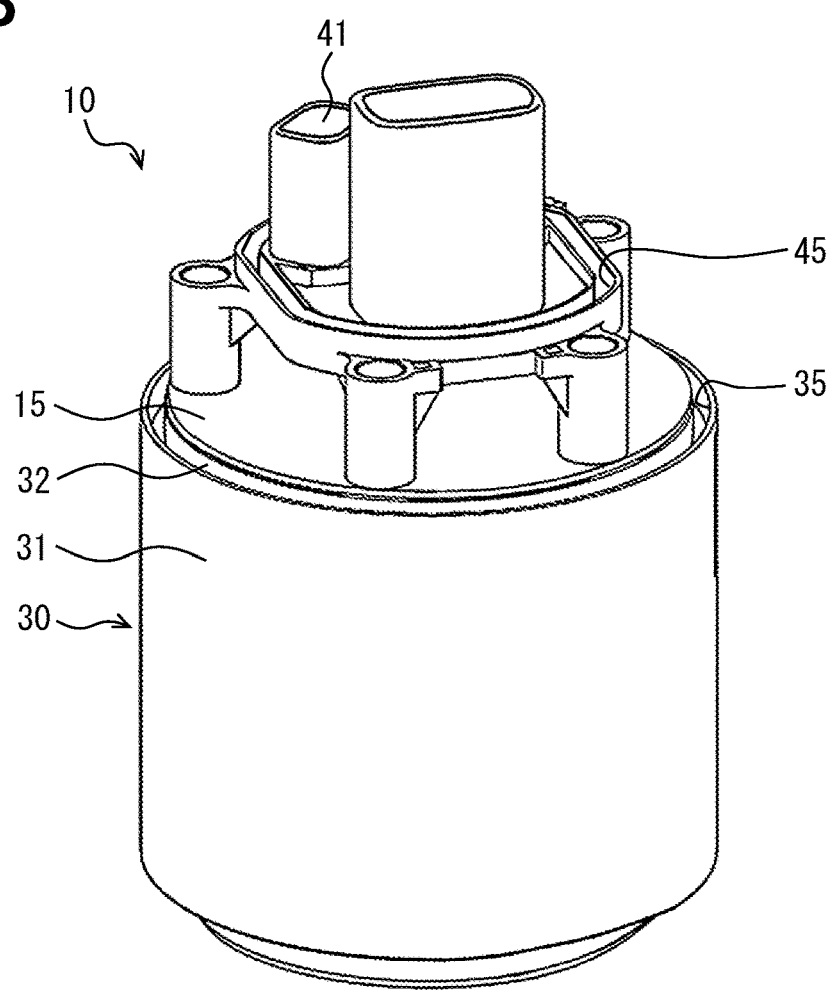
FIG. 3 is a perspective view showing a drive unit.

In FIG. 3, the circuit substrate 15 has a disk shape. The circuit substrate 15 is provided so as to cover the frame end 32. An outer peripheral adhesion recess portion 35 is formed in the frame 30. The outer peripheral adhesion recess portion 35 has a continuous annular shape. The outer peripheral adhesion recess portion 35 is provided radially outward of the circuit substrate 15. Here, radially refers to the rotation axis of the motor 11. The outer peripheral adhesion recess portion 35 is formed by two members, the motor case 31 and the frame end 32.

The connector 41 has an inner peripheral adhesion recess portion 45 formed therein. The inner peripheral adhesion recess portion 45 has a continuous annular shape. The inner peripheral adhesion recess portion 45 is provided radially inward of the outer peripheral adhesion recess portion 35 with respect to the rotation axis of the motor 11. The inner peripheral adhesion recess portion 45 is provided at a position away from the frame end 32. In other words, the inner peripheral adhesion recess portion 45 is provided at a position shifted from the outer peripheral adhesion recess portion 35 along the axial direction of the rotation axis of the motor 11.

Figure 4:
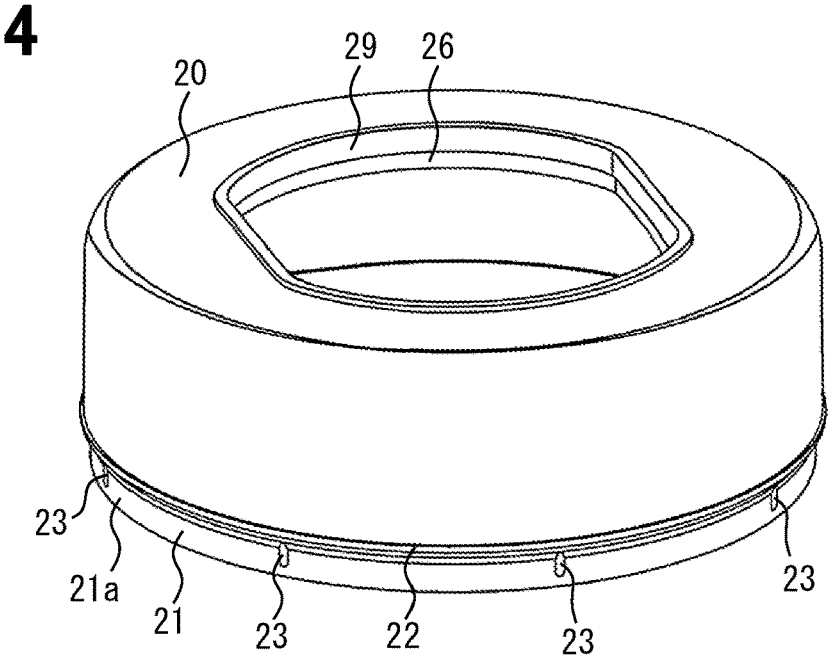
FIG. 4 is a perspective view showing an annular cover.

In FIG. 4, the annular cover 20 has a bottomed cylindrical shape. At the center of the bottom surface of the annular cover 20, an inner peripheral opening 29 forming a substantially circular opening is provided. Here as well, the term "bottom" is only intended to refer to the closed side of the annular cover 20, and does not limit directionality. The shape of the inner peripheral opening 29 may be any shape as long as at least a part of the connector 41 can be exposed to the outside, and is not limited to a substantially circular shape. For example, the shape may be a square shape or a semicircle shape, or may be a complex shape formed by combining various shapes.

The annular cover 20 includes the inner peripheral opening 29 which is an inner peripheral end portion, and also includes an outer peripheral end portion which is on the opposite side as the inner peripheral end portion. The outer peripheral end portion is located outward of the inner peripheral end portion. When the annular cover 20 is attached to the drive unit 10, the distance from the outer peripheral end portion to the frame 30 is less than the distance from the inner peripheral end portion to the frame 30.

An outer peripheral adhesion protrusion portion 21 is formed on the outer peripheral end portion. The outer peripheral adhesion protrusion portion 21 protrudes toward the frame 30. The outer peripheral adhesion protrusion portion 21 is provided continuously in an annular shape over the entire outer peripheral end portion. An outer surface protrusion portion 22 that protrudes from the outer surface of the annular cover 20 is formed near the outer peripheral adhesion protrusion portion 21. The protruding direction of the outer peripheral adhesion protrusion portion 21 and the protruding direction of the outer surface protrusion portion 22 are directions which intersect each other. The outer surface protrusion portion 22 is provided continuously in an annular shape along the outer surface of the annular cover 20. The outer surface protrusion portion 22 faces the motor case 31.

A spacer 23 is provided on the outer surface of the outer peripheral adhesion protrusion portion 21. The spacer 23 is a ridge provided so as to protrude along a direction along the axial direction of the cylindrical annular cover 20. The spacer 23 is provided from the outer surface protrusion portion 22 to the outer peripheral adhesion protrusion portion 21. A plurality of spacers 23 are provided on the outer surface of the outer peripheral adhesion protrusion portion 21. The plurality of spacers 23 are provided at eight locations and lined up so as to form a discontinuous annular shape. Adjacent spacers 23 are arranged at equal intervals. It should be noted that the number of spacers 23 is not limited to eight, and may be more or less than eight. For example, spacers 23 may be provided at three locations so as to form a triangle with each other.

The spacer 23 has a semicircular cross section. Thereby, even when the spacer 23 comes into contact with another component, it is easy to avoid the spacer 23 being significantly crushed. For this reason, the amount that the outer peripheral adhesion protrusion portion 21 protrudes from the outer surface is reliably maintained, and the spacer 23 reliably functions as a spacer to retain spacing. However, the cross-sectional shape of the spacer 23 is not limited to a semicircle. For example, the shape may be triangular or square.

The spacer 23 forms a gap between the outer peripheral adhesion protrusion portion 21 and the outer peripheral adhesion recess portion 35. The size of this gap is equal to the amount of protrusion of the spacer 23 from the outer surface of the outer peripheral adhesion protrusion portion 21. In other words, the gap between the outer peripheral adhesion protrusion portion 21 and the outer peripheral adhesion recess portion 35 can be increased by increasing the protrusion amount of the spacer 23.

An inner peripheral adhesion protrusion portion 26 is formed on the inner peripheral end portion, i.e., the inner peripheral opening 29. The inner peripheral adhesion protrusion portion 26 protrudes toward facing the frame 30. The inner peripheral adhesion protrusion portion 26 protrudes in a direction along the axial direction of the annular cover 20 and has a cylindrical shape. The inner peripheral adhesion protrusion portion 26 is provided continuously in an annular over the entire inner peripheral end portion.

Figure 5:
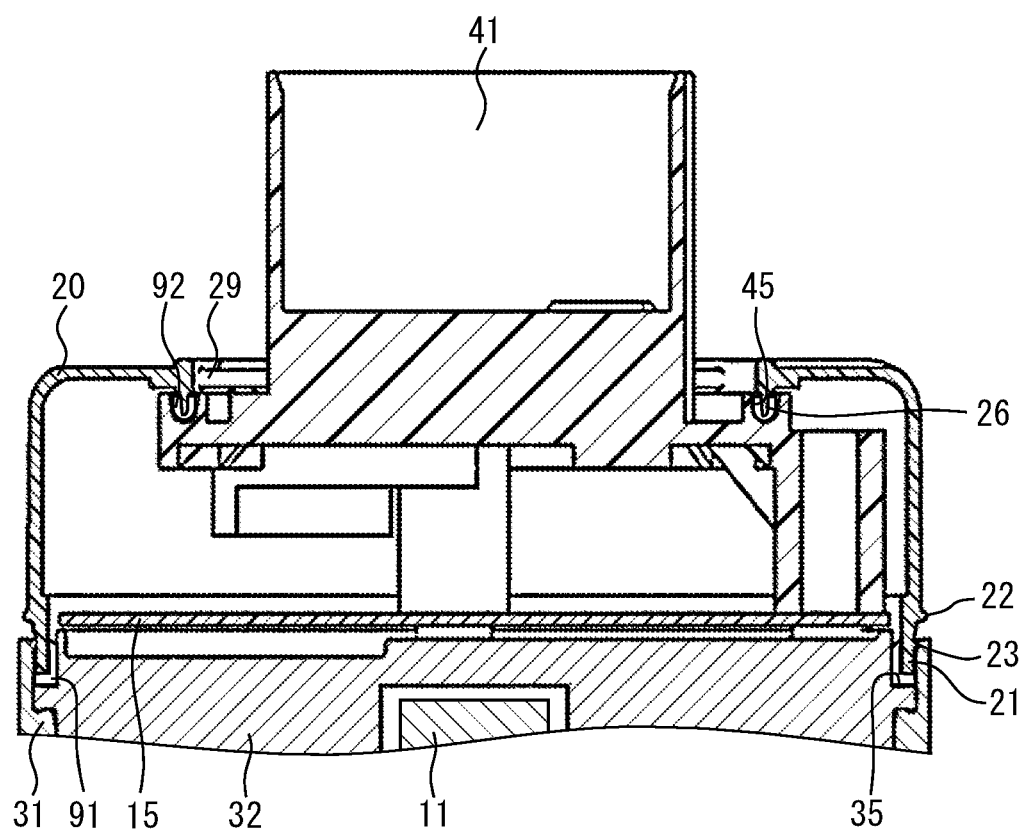
FIG. 5 is a partial enlarged view showing an adhesion portion between a drive unit and an annular cover.

In FIG. 5, the outer peripheral adhesion protrusion portion 21 and the outer peripheral adhesion recess portion 35 are bonded and fixed by an outer peripheral adhesive 91 provided continuously in a ring shape. This prevents the relative position between the annular cover 20 and the connector 41 from changing. In other words, the outer peripheral adhesive 91 prevents the annular cover 20 from slipping out of the drive unit 10. The outer peripheral adhesive 91 prevents water and dust from entering any gaps between the outer peripheral adhesion protrusion portion 21 and the outer peripheral adhesion recess portion 35. In summary, the outer peripheral adhesive 91 has two functions: a function of bonding and fixing the connector 41 to the annular cover 20, and a function of preventing foreign matter from entering between the connector 41 and the annular cover 20. The outer peripheral adhesive 91 is an example of an adhesive sealant.

The inner peripheral adhesion protrusion portion 26 and the inner peripheral adhesion recess portion 45 are adhered and fixed to each other by an inner peripheral adhesive 92 continuously provided in a ring shape. This prevents the relative position between the annular cover 20 and the frame 30 from changing. In other words, the inner peripheral adhesive 92 prevents the annular cover 20 from slipping out of the drive unit 10. The inner peripheral adhesive 92 prevents water and dust from entering through any gaps between the inner peripheral adhesion protrusion portion 26 and the inner peripheral adhesion recess portion 45. In summary, the inner peripheral adhesive 92 has two functions: a function of bonding and fixing the frame 30 to the annular cover 20, and a sealing function of preventing foreign matter from entering between the frame 30 and the annular cover 20.

As the outer peripheral adhesive 91 and the inner peripheral adhesive 92, for example, a silicone-based adhesive can be used. However, the outer peripheral adhesive 91 and the inner peripheral adhesive 92 only need to have a function of bonding components and a sealing function of preventing foreign matter such as water from entering from a portion where the components are bonded. In other words, the present disclosure is not limited to using silicone-based adhesives. For example, an acrylic adhesive or an epoxy adhesive can be used.

Figure 6:
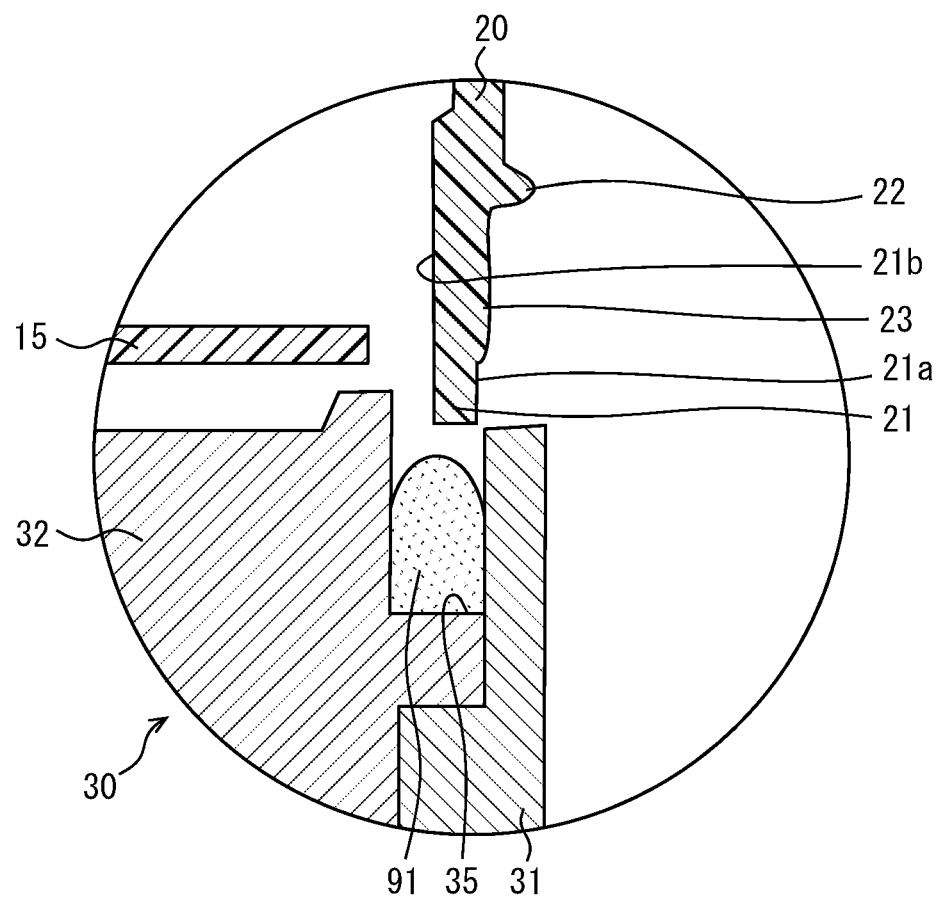
FIG. 6 is an explanatory diagram showing a state before bonding between an outer peripheral adhesion protrusion portion and an outer peripheral adhesion recess portion.

The bonding process using the outer peripheral adhesive 91 will be described below. FIG. 6 shows a state before the outer peripheral adhesion protrusion portion 21 and the outer peripheral adhesion recess portion 35 are bonded and fixed to each other. The outer peripheral adhesive 91 is provided in the outer peripheral adhesion recess portion 35 surrounded on three sides. The outer peripheral adhesive 91 is applied so as to be in contact with two components, i.e., the motor case 31 and the frame end 32. At this point, the outer peripheral adhesive 91 is in a soft state prior to hardening.

The annular cover 20 is moved closer to the frame 30 to which the outer peripheral adhesive 91 has been applied, and the outer peripheral adhesion protrusion portion 21 is inserted into the outer peripheral adhesion recess portion 35. The direction in which the outer peripheral adhesion protrusion portion 21 is inserted into the outer peripheral adhesion recess portion 35 is the direction in which the annular cover 20 is mounted. The annular cover 20 is moved in the mounting direction beyond the position where the outer peripheral adhesion protrusion portion 21 contacts the outer peripheral adhesive 91. As a result, the outer peripheral adhesive 91 is pushed out by the outer peripheral adhesion protrusion portion 21, and the outer peripheral adhesive 91 spreads to each corner. Therefore, even if the outer peripheral adhesive 91 is discontinuously applied prior to the bonding, the outer peripheral adhesive 91 is expanded and spread by the outer peripheral adhesion protrusion portion 21 so that the outer peripheral adhesive 91 is continuously provided in a ring shape.

Figure 7:
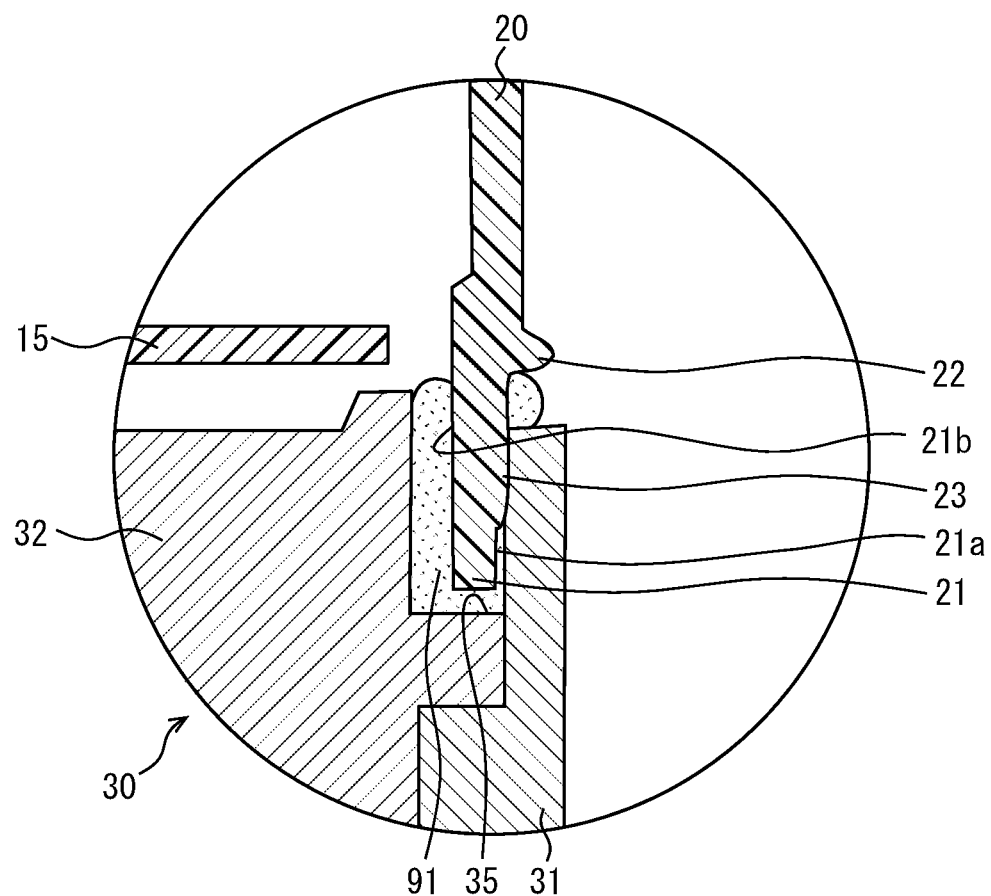
FIG. 7 is an explanatory view showing a state after bonding between an outer peripheral adhesion protrusion portion and an outer peripheral adhesion recess portion.

FIG. 7 shows a state after the outer peripheral adhesion protrusion portion 21 and the outer peripheral adhesion recess portion 35 are adhesively to each other. The outer peripheral adhesive 91 is in contact with three components in this state, i.e., the motor case 31, the frame end 32, and the annular cover 20. At this point, the outer peripheral adhesive 91 is solidified in a state of being disposed continuously in a ring shape. Therefore, the outer peripheral adhesive 91 adhesively fixes the three components to each other, i.e., the motor case 31, the frame end 32, and the annular cover 20. In other words, the outer peripheral adhesive 91 prevents foreign substances from entering between the motor case 31 and the annular cover 20 and also prevents foreign substances from entering between the frame end 32 and the annular cover 20.

The outer peripheral adhesion protrusion portion 21 has a plurality of opposing surfaces facing the outer peripheral adhesion recess portion 35. Among the plurality of opposing surfaces of the outer peripheral adhesion protrusion portion 21, the surfaces facing directions intersecting the mounting direction of the annular cover 20 are side opposing surfaces. The side facing surfaces of the outer peripheral adhesion protrusion portion 21 include an outward facing surface 21a and an inward facing surface 21b. The outward facing surface 21a faces the outer side surface of the outer peripheral adhesion recess portion 35 located radially outward with respect to the rotation axis of the motor 11. The inward facing surface 21b is faces the inner side surface of the outer peripheral adhesion recess portion 35 located radially inward with respect to the rotation axis of the motor 11.

The spacer 23 is provided only on the outward facing surface 21a, and is not provided on the inward facing surface 21b. The spacer 23 is in contact with the outer peripheral adhesion recess portion 35. Therefore, there is a space between the portions of the outward facing surface 21a where the spacer 23 is not provided and the outer peripheral adhesion recess portion 35. The size of this space is equal to the protrusion amount of the spacer 23. The outer peripheral adhesive 91 penetrates into this space to adhere and fix the outward facing surface 21a to the outer peripheral adhesion recess portion 35. Therefore, it is possible to control the amount of the outer peripheral adhesive 91 that enters into the space between the outward facing surface 21a and the outer peripheral adhesion recess portion 35. In other words, it is possible to avoid a situation where there is no space between the outward facing surface 21a and the outer peripheral adhesion recess portion 35 for the outer peripheral adhesive 91 to enter. In such a situation, the amount of adhesive surface between the outward facing surface 21a and the outer peripheral adhesion recess portion 35 may be insufficient.

It should be noted that the spacer 23 is not necessarily in contact with the outer peripheral adhesion recess portion 35. In other words, for both the surface on which the spacer 23 is provided and the surface on which the spacer 23 is not provided, a space facing the outer peripheral adhesion recess portion 35 may be appropriately formed to allow the outer peripheral adhesive 91 to enter.

Prior to hardening, the outer peripheral adhesive 91 spreads to fill the space between the outward facing surface 21a and the outer peripheral adhesion recess portion 35 formed by the spacer 23, and reaches the outer surface protrusion portion 22. Upon reaching the outer surface protrusion portion 22, the outer peripheral adhesive 91 is unable to further spread along the outer surface of the annular cover 20 in the mounting direction. For this reason, the outer peripheral adhesive 91 then spreads in a direction intersecting the mounting direction, with the movement direction being restricted by the outer surface protrusion portion 22. At this time, a part of the outer peripheral adhesive 91 reaches a space between the outer surface protrusion portion 22 and the motor case 31. In other words, a part of the outer peripheral adhesive 91 adheres the outer surface protrusion portion 22 to the end of the motor case 31. Therefore, compared to the case where the outer surface protrusion portion 22 is not provided, a larger bonding surface can be ensured.

When the outer peripheral adhesive 91 is continuously provided in a ring shape on the outer surface of the drive device 1 between the outer surface protrusion portion 22 and the motor case 31, the drive unit 10 and the annular cover 20 are properly bonded and fixed to each other by the outer peripheral adhesive 91. In this state, foreign substances are prevented from entering through spaces between the outer peripheral adhesion protrusion portion 21 and the outer peripheral adhesion recess portion 35. In other words, after completion of the bonding process, it is possible to check whether each component is appropriately bonded to each other or not by checking whether or not the outer peripheral adhesive 91 is continuously provided in a loop between the outer surface protrusion portion 22 and the motor case 31. In this case, it is preferable to use an opaque adhesive as the outer peripheral adhesive 91 so the presence of the outer peripheral adhesive 91 can be more easily confirmed visually. The color of the outer peripheral adhesive 91 is preferably different from the color of the annular cover 20 and the motor case 31.

The outer surface protrusion portion 22, which protrudes as an eave from the outer surface of the annular cover 20, also functions to protect the outer peripheral adhesive 91 from external impacts. For example, even if pebbles or the like are likely to collide with the outer peripheral adhesive 91 exposed on the outer surface of the drive device 1, the pebbles are less likely to directly collide with the outer peripheral adhesive 91 due to collision with the outer surface protrusion portion 22. According to this, it is possible to prevent the outer peripheral adhesive 91 from peeling off the annular cover 20 and the frame 30 due to external impacts, and prevent the outer peripheral adhesive 91 from being cracked. Therefore, the outer peripheral adhesive 91 can easily perform the two functions bonding and fixing the components to each other as well as preventing foreign substances from entering the drive device 1 over a long period of time. In particular, when the drive device 1 is mounted on a vehicle, the drive device 1 is likely to come into contact with pebbles or the like during traveling. Therefore, a configuration for protecting the outer peripheral adhesive 91 from collision with pebbles or the like is very useful when the drive device 1 is used for a vehicle.

The thickness of the outer peripheral adhesive 91 located between the inward facing surface 21b and the outer peripheral adhesion recess portion 35 is larger than the thickness of the outer peripheral adhesive 91 located between the outward facing surface 21a and the outer peripheral adhesion recess portion 35. In other words, the distance between the inward facing surface 21b and the outer peripheral adhesion recess portion 35 is greater than the amount of protrusion of the spacer 23. Accordingly, it is easier to maintain a state in which the outer peripheral adhesive 91 is continuously provided in a ring shape on the side opposite to the side on which the spacers 23 are provided. Therefore, the outer peripheral adhesive 91 can more reliably prevent foreign matter from entering between the frame end 32 and the annular cover 20.

According to the above-described embodiment, the drive device 1 includes the spacers 23 that maintain a distance between the outer peripheral adhesion recess portion 35 and the outer peripheral adhesion protrusion portion 21. Therefore, a space is formed between the outer peripheral adhesion recess portion 35 and the outer peripheral adhesion protrusion portion 21 into which the outer peripheral adhesive 91 can enter. As a result, it is easier to ensure a large bonding area between the outer peripheral adhesion recess portion 35 and the outer peripheral adhesion protrusion portion 21 that is bonded by the outer peripheral adhesive 91. In addition, it is easier to avoid a portion where the outer peripheral adhesion recess portion 35 and the outer peripheral adhesion protrusion portion 21 are not bonded by the outer peripheral adhesive 91 being biased to a specific portion. Therefore, it is easier to maintain a state in which the drive unit 10 and the annular cover 20 are well bonded together by the outer peripheral adhesive 91. In addition, when manufacturing the drive device 1, poor bonding with the outer peripheral adhesive 91 is less likely to occur. As described above, it is possible to provide the drive device 1 in which the components such as the drive unit 10 and the annular cover 20 are well bonded to each other.

The spacers 23 are provided so as to protrude from the side facing surface of the outer peripheral adhesion protrusion portion 21 facing the outer peripheral adhesion recess portion 35. The spacers 23 protrude toward the outer peripheral adhesion recess portion 35. For this reason, the spacers 23 can be directly disposed at portions where a space for the outer peripheral adhesive 91 should be formed. Therefore, it is possible to ensure a large bonding surface for the outer peripheral adhesive 91 with a simple configuration by using the spacers 23. In other words, the adhesion between the drive unit 10 and the annular cover 20 can be stabilized with a simple configuration as compared with a case where a space is secured by disposing another component.

Adjacent spacers 23 are provided at positions separated from each other at equal intervals. For this reason, it is easier to avoid a portion where the outer peripheral adhesion recess portion 35 and the outer peripheral adhesion protrusion portion 21 are not bonded by the outer peripheral adhesive 91 being biased to a specific portion. Therefore, it is easier to control the outer peripheral adhesive 91 to a desired thickness, for example, by making the thickness of the outer peripheral adhesive 91 uniform.

The outer peripheral adhesive 91 is provided in an annular shape continuously between the outer surface of the outer peripheral adhesion protrusion portion 21 and the outer peripheral adhesion recess portion 35 where the spacers 23 are not provided. For this reason, intrusion of foreign matter into the inside can be prevented to a greater degree than at least the outer peripheral adhesive 91 being provided continuously in a ring shape. Here, when the spacer 23 and the outer peripheral adhesion recess portion 35 are in contact with each other, the outer peripheral adhesive 91 positioned between the outer peripheral adhesion recess portion 35 and the side of the outer peripheral adhesion protrusion portion 21 where the spacer 23 is provided may be discontinuous. Therefore, by making at least a part of the outer peripheral adhesion protrusion portion 21 continuous in an annular shape, the outer peripheral adhesive 91 can exhibit a sealing function of preventing foreign matter from entering the drive device 1.

The outer peripheral adhesion recess portion 35 is formed in the frame 30. For this reason, the annular cover 20 can be directly adhered and fixed to the frame 30 which is a component for fixing the motor 11. Therefore, compared to the case where the annular cover 20 is indirectly fixed to the frame 30, the state in which the frame 30 and the annular cover 20 are adhesively fixed to each other is more easily maintained. If the annular cover 20 is fixed to the connector 41, the annular cover 20 will be detached from the drive unit 10 not only when the annular cover 20 is detached from the connector 41 but also when the connector 41 is detached from the frame 30. In particular, when the drive device 1 is mounted on a vehicle, the drive device 1 is easily affected by vibrations during traveling. For this reason, the configuration in which the annular cover 20 does not easily come off even when a large vibration is applied is very useful when the drive device 1 is used for a vehicle.

In addition, when the frame 30 is made of metal, volume change with respect to temperature change is smaller than that of resin components, and it is easier to maintain an appropriate bonding state with the outer peripheral adhesive 91. In particular, when the drive device 1 is mounted on a vehicle, the drive device 1 is exposed to an external environment, and temperature may change greatly. For this reason, a configuration in which the annular cover 20 is easily maintained in a properly bonded state even when a large temperature change occurs is very useful when the drive device 1 is used for a vehicle.

Further, even when the connector 41 is attached to the frame 30 with a slight displacement, the annular cover 20 can be easily attached to the frame 30 without being affected by the displacement between the frame 30 and the connector 41.

The spacer 23 is in contact with the outer peripheral adhesion recess portion 35. Therefore, the distance from the outward facing surface 21a to the outer peripheral adhesion recess portion 35 and the amount of protrusion of the spacer 23 can be made equal. As a result, the thickness of the outer peripheral adhesive 91 can be easily controlled. Accordingly, it is possible to avoid a state in which the outer peripheral adhesive 91 is unable to enter between the inward facing surface 21b and the outer peripheral adhesion recess portion 35 by caused by the distance from the inward facing surface 21b on the side where the spacer 23 is not provided to the outer peripheral adhesion recess portion 35 being too small. As described above, it is easy to control the thickness of the outer peripheral adhesive 91 to a desired thickness.

The outer peripheral adhesive 91 adhesively fixes the three components to each other, i.e., the motor case 31, the frame end 32, and the annular cover 20. Therefore, there is no need to provide a first seal member between the motor case 31 and the annular cover 20 and provide a second seal member different from the first seal member between the frame end 32 and the annular cover 20. In other words, the sealability of a plurality of components can be simultaneously secured by the outer peripheral adhesive 91 as one member.

Second Embodiment

The present embodiment is a modification in which the preceding embodiment is a base embodiment. In this embodiment, the spacers 23 are not provided on the outward facing surface 21a, and instead, spacers 223 are provided on the inward facing surface 21b.

Figure 8:
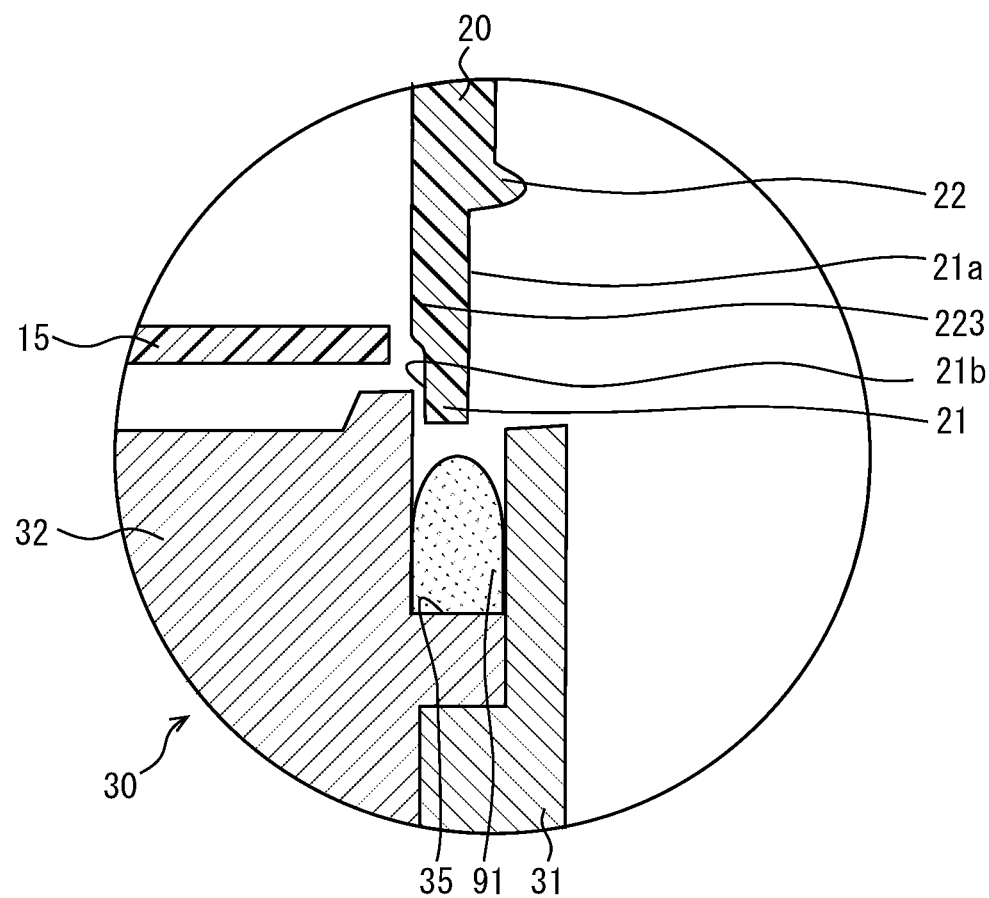
FIG. 8 is an explanatory diagram showing a state before bonding between an outer peripheral adhesion protrusion portion and an outer peripheral adhesion recess portion in a second embodiment.

The bonding process using the outer peripheral adhesive 91 in the second embodiment will be described below. FIG. 8 shows a state before the outer peripheral adhesion protrusion portion 21 and the outer peripheral adhesion recess portion 35 are bonded and fixed to each other. From this state, the annular cover 20 is moved in the mounting direction with respect to the frame 30 to which the outer peripheral adhesive 91 has been applied. As a result, the outer peripheral adhesive 91 is pushed out by the outer peripheral adhesion protrusion portion 21, and the outer peripheral adhesive 91 spreads to each corner.

Figure 9:
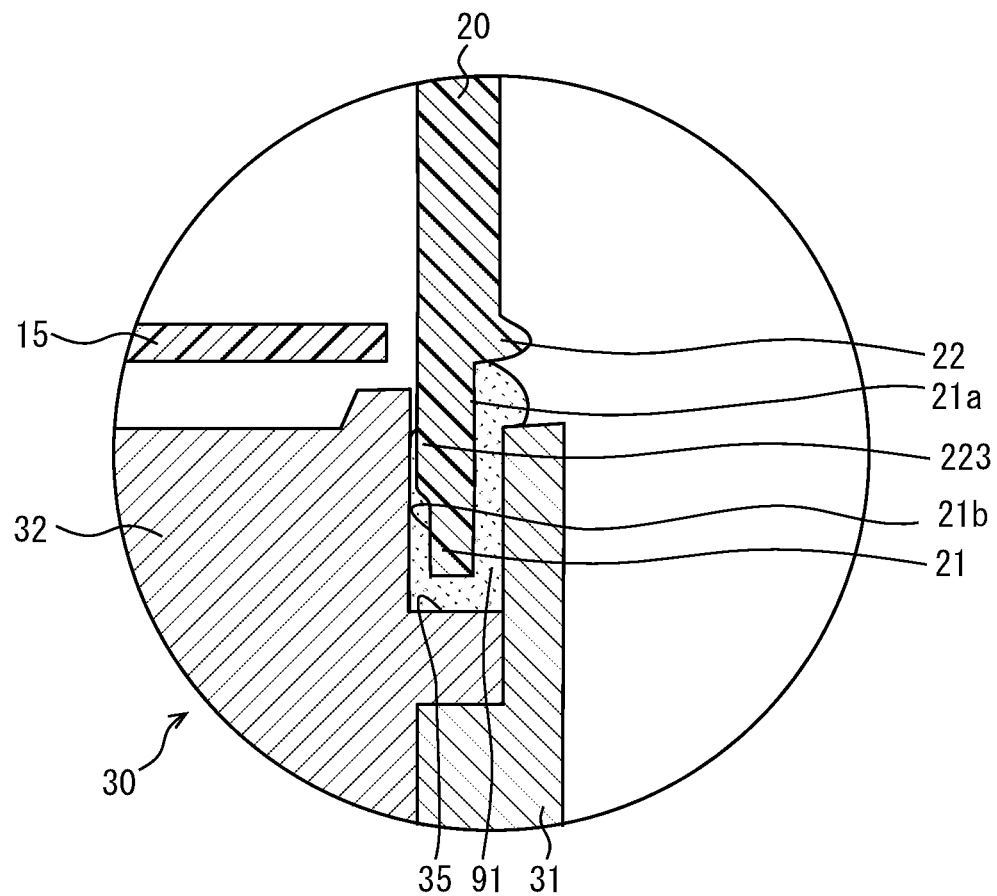
FIG. 9 is an explanatory diagram showing a state after bonding between an outer peripheral adhesion protrusion portion and an outer peripheral adhesion recess portion in a second embodiment.

FIG. 9 shows a state after the outer peripheral adhesion protrusion portion 21 and the outer peripheral adhesion recess portion 35 are adhesively to each other. Part of the outer peripheral adhesive 91 is located between the outward facing surface 21a and the outer peripheral adhesion recess portion 35. Further, part of the outer peripheral adhesive 91 is located between the inward facing surface 21b and the outer peripheral adhesion recess portion 35. In other words, the outer peripheral adhesive 91 adhesively fixes the three components to each other, i.e., the motor case 31, the frame end 32, and the annular cover 20.

The spacers 223 are provided only on the inward facing surface 21b, and are not provided on the outward facing surface 21a. There is a space between the portions of the inward facing surface 21b where the spacer 223 is not provided and the outer peripheral adhesion recess portion 35. The size of this space is equal to or greater than the protrusion amount of the spacer 223. The outer peripheral adhesive 91 enters this space to adhere and fix the inward facing surface 21b to the outer peripheral adhesion recess portion 35. Therefore, by controlling the protrusion amount of the spacer 223, it is possible to control the amount of the outer peripheral adhesive 91 that enters between the inward facing surface 21b and the outer peripheral adhesion recess portion 35.

Due to the outer peripheral adhesive 91 entering the space between the inward facing surface 21b and the outer peripheral adhesion recess portion 35, the spacer 223 is bonded and fixed at a position slightly away from the outer peripheral adhesion recess portion 35. For this reason, the outer peripheral adhesive 91 enters the space between the spacer 223 and the outer peripheral adhesion recess portion 35, and the spacer 223 and the outer peripheral adhesion recess portion 35 are adhered and fixed to each other. Alternatively, the spacer 223 may be in contact with the outer peripheral adhesion recess portion 35.

The thickness of the outer peripheral adhesive 91 located between the outward facing surface 21a and the outer peripheral adhesion recess portion 35 is larger than the thickness of the outer peripheral adhesive 91 located between the inward facing surface 21b and the outer peripheral adhesion recess portion 35. In other words, the distance between the outward facing surface 21a and the outer peripheral adhesion recess portion 35 is greater than the amount of protrusion of the spacer 223. Accordingly, it is easier to maintain a state in which the outer peripheral adhesive 91 is continuously provided in a ring shape on the side opposite to the side on which the spacers 223 are provided. Therefore, the outer peripheral adhesive 91 can more reliably prevent foreign matter from entering between the motor case 31 and the annular cover 20. In other words, it is possible to reliably prevent foreign matter from entering on the upstream side of the foreign matter entry path from the frame end 32. Therefore, the outer peripheral adhesive 91 can easily prevent foreign matter from entering the drive device 1.

According to the above-described embodiment, the spacer 223 is provided on the inward facing surface 21b, and is not provided on the outward facing surface 21a. For this reason, the spacer 223 does not prevent the outer peripheral adhesive 91 from being continuously formed in an annular shape on the outward facing surface 21a, which is a position near the outer surface that is upstream along the foreign matter entry path. Therefore, the outer peripheral adhesive 91 is stably disposed between the outward facing surface 21a and the outer peripheral adhesion recess portion 35, so that it is easy to prevent foreign matter from entering the inside of the drive device 1. In particular, the outward facing surface 21a is located upstream of the inward facing surface 21b in the foreign matter entry path. For this reason, it is very useful to prevent the entry of foreign substances by filling the outer peripheral adhesive 91 between the outward facing surface 21a and the outer peripheral adhesion recess portion 35 continuously and annularly.

Other Embodiments

Although the case where the spacers 23 and 223 are provided on the outer peripheral adhesion protrusion portion 21 has been described as an example, the spacers 23 and 223 may be provided on the inner peripheral adhesion protrusion portion 26 as well. According to this, it is possible to stably form a space between the inner peripheral adhesion protrusion portion 26 and the inner peripheral adhesion recess portion 45 into which the inner peripheral adhesive 92 can enter. As a result, it is easier to ensure a large bonding area between the inner peripheral adhesion recess portion 45 and the inner peripheral adhesion protrusion portion 26 that is bonded by the inner peripheral adhesive 92. In addition, it is easier to avoid a portion where the inner peripheral adhesion recess portion 45 and the inner peripheral adhesion protrusion portion 26 are not bonded by the inner peripheral adhesive 92 being biased to a specific portion.

Entry of foreign matter between the drive unit 10 and the annular cover 20 may be prevented by using an annular contact component such as an O-ring. In this case, the outer peripheral adhesive 91 and the inner peripheral adhesive 92 do not need to have a sealing function for preventing foreign substances from entering the inside of the drive device 1, and can be used solely for their adhesive function. Alternatively, both an O-ring and the adhesives may be used to prevent foreign matter from entering to increase redundancy. According to this, it is possible to more reliably prevent water from splashing on the circuit substrate 15 and the like, and to easily operate the drive device 1 stably.

When sealing property is ensured by using an annular contact component such as an O-ring, the O-ring needs to be closely attached to a portion where the sealing property is desired to be ensured. For this reason, a structure for making the O-ring adhere closely is required. When an O-ring is provided between the drive unit 10 and the annular cover 20, the O-ring can be brought into close contact with the drive unit 10 by fixing a screw to the annular cover 20, for example. Further, when sealing property is ensured by using an O-ring, it is necessary to prevent the O-ring from shifting in position in order to prevent the O-ring from shifting during assembly. Therefore, a structure for preventing the displacement of the O-ring is required. On the other hand, when sealing property is ensured by using an adhesive, the adhesive is in a soft state before hardening and follows the shape of the bonding surface. As a result, it is not necessary to provide a structure for bringing the adhesive into close contact or a structure for preventing displacement. Therefore, by using adhesives, it is possible to ensure sealing property with a simple configuration. Therefore, it is easier to design the drive device 1 to be thinner and smaller.

When the sealing property is ensured using an annular close contact component such as an O-ring, the portions in contact with the O-ring serves as a sealing surface. For this reason, in order to ensure a large sealing surface, it is necessary to use a large O-ring or to use a plurality of O-rings. On the other hand, when sealing property is ensured by using adhesives, a large sealing surface can be easily ensured by providing irregularities on the sealing surface.

The disclosure in this specification and drawings is not limited to the exemplified embodiments. The disclosure includes the exemplified embodiments and variations thereof by those skilled in the art based thereon. For example, the disclosure is not limited to the combinations of components and/or elements shown in the embodiments. The disclosure may be implemented in various combinations. The disclosure may have additional parts that can be added to the embodiments. The disclosure encompasses omission of components and/or elements of the embodiments. The disclosure encompasses the replacement or combination of components and/or elements between one embodiment and another. The disclosed technical scope is not limited to the description of the embodiments. It should be understood that some disclosed technical ranges are indicated by description of claims, and includes every modification within the equivalent meaning and the scope of description of claims.

The disclosure in the specification, drawings and the like is not limited by the description of the claims. The disclosures in the specification, the drawings, and the like encompass the technical ideas described in the claims, and further extend to a wider variety of technical ideas than those in the claims. Therefore, various technical ideas can be extracted from the disclosure of the specification, the drawings and the like without being limited to the description of the claims.

The invention claimed is:

1. A drive device, comprising:
   a drive unit including an adhesion recess portion that is annular shaped;
   a cover including an adhesion protrusion portion, which is annular shaped, that faces the adhesion recess portion;
   an adhesive sealant that adheres the adhesion recess portion to the adhesion protrusion portion; and
   a spacer that maintains a distance between the adhesion recess portion and the adhesion protrusion portion, wherein
   the drive unit includes
     a motor, and
     a frame that houses the motor in a fixed state, and
   the adhesion recess portion is formed in the frame, and wherein
   the frame includes a motor case that is a cylindrical body and a frame end that forms a bottom surface,
   the frame houses the motor in a housing space surrounded by the motor case and the frame end,
   the adhesion recess portion is formed between the motor case and the frame end, and
   the adhesion recess portion is defined by the motor case and the frame end.

2. The drive device according to claim 1, wherein the spacer is provided so as to protrude from a side facing surface of the adhesion protrusion portion toward the adhesion recess portion, the side facing surface being formed to face toward the adhesion recess portion.

3. The drive device according to claim 2, wherein
   the side facing surface includes
     an inward facing surface, and
     an outward facing surface opposite to the inward facing surface, and
   the spacer is provided on the inward facing surface and is not provided on the outward facing surface.

4. The drive device according to claim 3, wherein the adhesive sealant is continuously provided in an annular shape between the outward facing surface and the adhesion recess portion.

5. The drive device according to claim 3, wherein the inward facing surface faces in a direction toward an axial center of the motor and faces the frame end, and the outward facing surface faces away from the axial center of the motor and faces the motor case.

6. The drive device according to claim 5, wherein a distance between the outward facing surface and the motor case in a radial direction of the motor is greater than a protrusion amount of the spacer in the radial direction.

7. The drive device according to claim 1, wherein the spacer is in contact with the adhesion recess portion.

8. The drive device according to claim 1, wherein a plurality of spacers are provided, and adjacent spacers are provided at positions separated from each other at equal intervals.

9. The drive device according to claim 1, wherein the frame is made of metal.

10. The drive device according to claim 1, wherein the frame end is positioned within the motor case.

11. The drive device according to claim 1, wherein the adhesion protrusion portion is positioned between the motor case and the frame end with respect to a radial direction of the motor.

* * * * *